June 4, 1935.  K. MORSBACH  2,003,971

MOTION PICTURE CAMERA

Filed May 31, 1930

INVENTOR
KURT MORSBACH
By
ATTORNEYS

Patented June 4, 1935

2,003,971

UNITED STATES PATENT OFFICE 2,003,971

MOTION-PICTURE CAMERA

Kurt Morsbach, Berlin-Lichterfelde, Germany, assignor to Siemens & Halske, Aktiengesellschaft, Siemensstadt, near Berlin, Germany, a corporation of Germany Application May 31, 1930, Serial No. 458,643
In Germany June 10, 1929

8 Claims. (Cl. 88—18.4)

My invention relates to motion-picture cameras, and more particularly to such cameras driven by clockwork.

Numerous motion-picture cameras and in particular cameras of this type intended for use by amateurs are provided with a rigidly mounted clockwork or spring mechanism for driving the film propelling or feeding mechanism. As a rule the spring does not run down completely during the taking of a certain picture but remains in a more or less wound-up state after the picture has been photographed. In known apparatus it is not possible to let the clockwork run down after the exposure of the film as otherwise the film would uselessly be passed through the camera and could not be used for taking further photographs. In known cameras the clockwork must thus remain in a more or less wound-up state after the picture has been taken. It is obvious that in this way the clockwork is subjected to unnecessary stresses since it is hardly ever relaxed altogether and before taking a fresh picture is fully wound up again from the partly relaxed state.

According to my invention this drawback of the known cameras is eliminated by providing on the camera a device which for the purpose of relaxing the spring renders the film propelling mechanism driven by the clockwork inoperative. This may be effected by means of a disengaging device which by means of a handle adjustable by hand at will is adapted to be placed in the path of the film gripper or a part rigidly connected with it so that while the spring runs down the propelling mechanism is operated but is unable to engage the perforations of the film for feeding the film. By means of such a device it is thus according to my invention possible to let the clockwork run down completely after each exposure without the unexposed portion of the film being unwound from the unwinding reel and being wound up on the winding-on reel.

In order to obtain a simple disengaging device the film feeding mechanism is designed in the manner of the known ratchet mechanisms which during the taking of the photographs and during the working stroke is brought into engagement with the perforations of the film by the action of a spring and thus advances the film but which during the oppositely directed idle stroke slides along the film without moving it. By inserting a stop or abutment into the path of movement of the pawl of the ratchet mechanism the pawl is according to my invention prevented from engaging the perforations of the film also during the working stroke.

In a preferred embodiment of my invention the disengaging mechanism is designed as a gong or bell, or a gong or bell is placed in the path of movement of the pawl of the ratchet mechanism in such a way that the sound of the gong or bell when struck by the pawl tells the user whether the pawl runs idle or whether the film is propelled. It will be understood that a visible sign might be employed instead of the audible.

An embodiment of my invention is by way of example illustrated in the drawing affixed to my specification and forming part thereof. In the drawing.

Figure 1:
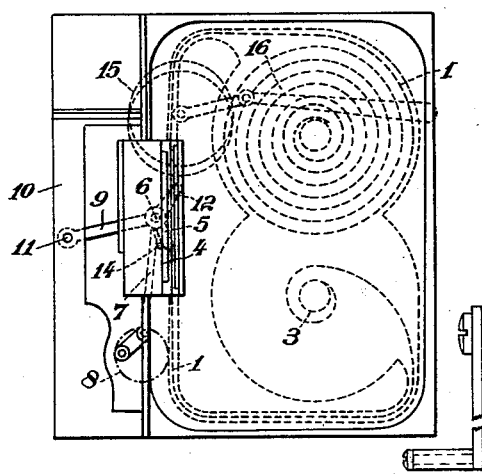
Fig. 1 shows a photographic camera with film box or container and film disengaging device according to my invention in side-elevation in diagrammatic representation.
Figure 2:
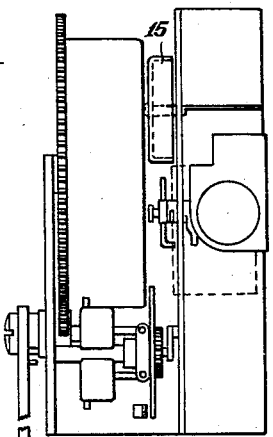
Fig. 2 shows the camera in front-elevation.
Figure 3:
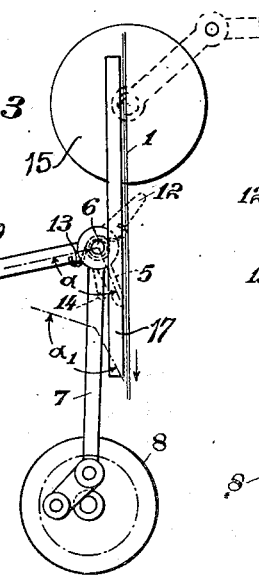
Figs. 3 and 4 show the ratchet mechanism for propelling the film on an enlarged scale.
Figure 4:
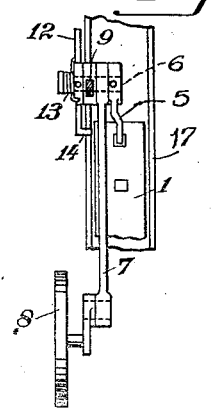
Figure 5:
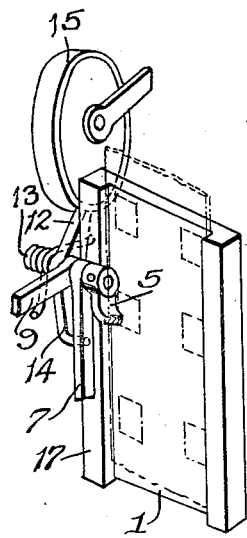
Fig. 5 is a fragmentary perspective view of certain parts. Like parts are indicated by like numerals of reference throughout the various figures of the drawing.

Referring to Fig. 1 of the drawing 1 is the film which during an exposure is unwound from the unwinding reel 2 and wound on to the winding reel 3. The film runs intermittently through the film channel 4, a pawl 5 mounted on a pivot pin 6 engaging the perforations of the film. The pivot pin 6 is adapted to be vertically reciprocated by a system of crank rods 7, operated by a crank disk 8, see Figs. 3 and 4. The pawl 5 is guided by rocking lever arm 9 pivoted upon a pin 11 in the housing 10 of the camera. On the pivot pin 6 of the pawl 5 there is also mounted a nose or arm 12. The nose 12 as well as the pawl 5 are rigidly mounted upon the pivot pin 6 and maintain their relative positions during the operation of the pawl. A spring 13 one end of which is attached to the nose 12 and the other end to the rocking lever 9 tends to bring the pawl 5 into engagement with the perforations of the film 1. The pawl 5 and the nose 12 are so secured upon the common pivot pin 6 that a rotative movement relatively to each other is impossible. The nose 12 is further rigidly connected with a stop 14, so that the parts 5, 6, 12 and 14 constitute a unit and operate as such. During the operation of the pawl 5 the stop 14 slides along a suitable stationary guide surface, as for instance, a lateral flange 17 of the film channel 4. By means of the spring 13 the stop 14 is continuously pressed against the flange 17 or its equivalent, so that the pawl 5 can enter the perforations of the film only to the extent predetermined by the cooperation of the stop 14 with the flange 17 or equivalent guide surface.

The provision of the spring 13 between the rocking lever 9 and the nose or extension 12 causes the tension of the spring to be highest when the pivot pin 6 of the pawl 5 is in its topmost position. From this topmost position in which the pawl 5 forms the angle α with the rocking lever 9 the tension of the spring gradually decreases towards the lowest position in which the angle between the parts 5 and 9 increases up to the angle α1 so that when the propelling stroke is completed the tension of the spring is lowest.

Above the nose 12 there is provided a gong 15 mounted on a double-armed lever 16 adapted to be adjusted from outside by hand so that the gong 15 may be raised and lowered, as clearly shown in Fig. 1 of the drawing.

The mode of operation of my improved mechanism is as follows: as long as the gong is in its upper position it cannot be touched by the nose or projection 12 even in the highest position of the pawl so that during each stroke the spring 13 is free to bring the pawl 5 in engagement with the perforations of the film. The pawl 5 thus carries the film along during its downward movement. During the upward movement of the pawl 5 its rear edge slides, however, along the film without carrying it along.

If, on the other hand, the gong 15 is lowered, the extension or nose 12 strikes the gong 15 and sounds the same at the upper portion of the upward movement of said nose 12 and by contact with said gong 15 moves the pawl 5 rearwardly so that it can no longer come into engagement with the perforations of the film. Only after the pin 6 has descended again by a definite portion of the stroke, contact of the stop 12 with the gong ceases, and the pawl 5 then engages the smooth solid part of the film between adjacent perforations and accordingly slides along the film without being able to entrain the film itself. The friction to which the film strip is then exposed is immaterial since, as pointed out before, the tension of the spring 13 relaxes during the descent of the pawl 5. This relaxation of the tension of the spring has the further advantage that the pawl 5 is engaged with the perforations of the film with comparatively great force during the normal exposure of the film, but that a small spring force has only to be overcome at the beginning of the idle stroke to lift the pawl out of the perforations of the film.

By designing the stop which throws the pawl 5 out of engagement with the perforations of the film as a gong the person handling the camera hears at once whether the pawl propels or advances the film strip or whether it is stationary in the film channel and the film propelling mechanism is idle during the working stroke.

The pawl mechanism described herein is particularly suitable for effecting the advance or feeding motion of small film strips since the small film has only one or a pair of perforations for the height of each film picture, the perforations of small films being as a rule located at the height of the line of separation between two consecutive film pictures.

It will be readily understood that the disengaging device may be designed in any other suitable manner without departing from the spirit of my invention and the ambit of the appended claims.

I claim as my invention:

1. In a motion-picture camera including a spring motor and film feeding mechanism operated by said motor, that improvement which comprises a disengaging signal device adjustable to and from an operative position, a projection combined with said film feeding means adapted to acuate said signal device when the latter is in its operative position and to be operated thereby to prevent operative movements of said film feeding mechanism from being transmitted to the film to thereby permit the spring motor to fully run down, and a lever accessible exteriorly of the camera for shifting said disengaging signal device to and from its operative position at will.

2. In a motion-picture camera including a spring motor, the combination of pivotally mounted and pivotally connected crank rods operated by said motor, a pawl pivotally connected with said crank rods for feeding engagement with the film to feed the same, a nose movable with said pawl, a device movably mounted in said camera and adjustable to and from an operative position, and adapted in its operative position to be engaged by said nose whereby said pawl is shifted out of feeding relation to said film without interference with the operation of said crank rods by said motor to thereby permit the latter to fully run down, and a lever accessible exteriorly of said camera for manually adjustitng said device to and from its operative position at will.

3. In a motion picture camera including a spring motor, a single film feeding mechanism including an element driven by said motor and having a path of movement during part of which it is in feeding engagement with said film and moves the same, a member movable with said element, a device having a cam surface adjustable to and from an operative position, said cam surface when the device is in its operatitve position being disposed so as to be engaged by said member to move said member whereby said element is shifted out of feeding engagement with said film and said spring motor may run down fully, and means accessible exteriorly of the camera for shifting said device to and from its operative position at will.

4. A motion picture camera including a spring motor and a single film feeding mechanism, said film feeding mechanism including an element having an intermittent film advancing movement during which it engages the film and moves the same, means associated with said element and movable therewith, a device having a cam surface and adjustable to and from a position in which said cam surface can be engaged by said associated means to move said means and consequently said element to a position in which said element is out of film advancing engagement with the film, whereby said spring motor may run down fully, and means accessible exteriorly of the camera for shifting said device to and from its operative position at will.

5. In a motion picture camera having a spring motor, a single film feeding mechanism, said film feeding mechanism including a film engaging element driven by said motor and having an intermittent film advancing movement, means for swinging said element out of film advancing position, said means comprising a member movable with said element, a device having a cam surface and adjustable to and from a position in which the cam surface is engaged by said member to swing said member and said element so that said element is free from film advancing engagement with said film, and said motor may run down fully, and means accessible exteriorly of the camera for shifting said device to and from its operative position at will.

6. In a motion picture camera having a spring motor, film feeding mechanism, said film feeding mechanism including a single film engaging element driven by said motor and having an intermittent film advancing movement, a member, said element and said member being rigid with respect to each other and swingable on a common axis, means for swinging said element out of film advancing position, said means comprising a device having a cam surface and adjustable to and from a position in which the cam surface is engaged by said member to move said member and said element about their common axis so that said element is free from film advancing engagement with said film and said motor may run down fully, and means accessible exteriorly of the camera for shifting said device to and from its operative position at will.

7. In a motion picture camera including a spring motor and a single film feeding mechanism operated by said motor, that improvement which comprises a signal device adjustable to and from an operative position, a member combined with said film feeding mechanism adapted to engage said signal device when the latter is in its operative position and to be operated thereby to prevent operative movements of said film feeding mechanism from being transmitted to the film and to permit the spring motor thereby to run down fully, and means accessible exteriorly of the camera for shifting said signal device to and from its operative position at will.

8. In a motion picture camera including a spring motor, a single film feeding mechanism including an element driven by said motor and having a path of movement during part of which it is in feeding engagement with said film and moves the same, a member movable with said element, a device having a cam surface adjustable to and from an operative position, said cam surface when the device is in its operative position being disposed so as to be engaged by said member to move said member whereby said element is shifted out of feeding engagement with said film and said spring motor may run down fully, and means accessible exteriorly of the camera for shifting said device to and from its operative position at will, the position of said means indicating whether or not the film will be moved.

KURT MORSBACH.